United States Patent
Felt et al.

(10) Patent No.: US 9,807,223 B2
(45) Date of Patent: Oct. 31, 2017

(54) VISUAL VOICE MAIL APPLICATION VARIATIONS

(71) Applicant: Verizon Patent and Licensing Inc., Arlington, VA (US)

(72) Inventors: Michelle Felt, Randolph, NJ (US); Henry H. Li, Madison, NJ (US); Jonghoon Kim, Jersey City, NJ (US); Neil T. Razzano, North Brunswick, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 702 days.

(21) Appl. No.: 14/311,864

(22) Filed: Jun. 23, 2014

(65) Prior Publication Data

US 2015/0373178 A1     Dec. 24, 2015

(51) Int. Cl.
*H04M 1/725* (2006.01)
*H04W 4/12* (2009.01)
*H04M 1/65* (2006.01)

(52) U.S. Cl.
CPC ....... *H04M 1/7255* (2013.01); *H04M 1/6505* (2013.01); *H04W 4/12* (2013.01)

(58) Field of Classification Search
CPC .... H04M 1/6505; H04M 1/7255; H04W 4/12
See application file for complete search history.

(56) References Cited

U.S. PATENT DOCUMENTS

| | | | | |
|---|---|---|---|---|
| 2008/0167011 | A1* | 7/2008 | Novick | H04M 1/6505 455/413 |
| 2010/0159892 | A1* | 6/2010 | Dunnam | G10L 21/06 455/413 |
| 2011/0012930 | A1* | 1/2011 | Davis | H04M 1/274525 345/666 |
| 2012/0081405 | A1* | 4/2012 | Bonnat | G06F 3/011 345/661 |
| 2012/0216139 | A1* | 8/2012 | Ording | G06F 3/0488 715/773 |
| 2013/0101096 | A1* | 4/2013 | Shaw | H04M 3/42 379/88.13 |
| 2013/0121481 | A1* | 5/2013 | Mikan | H04L 51/10 379/88.14 |
| 2013/0183942 | A1* | 7/2013 | Novick | H04M 1/7255 455/413 |
| 2015/0067605 | A1* | 3/2015 | Zambetti | G06F 3/0485 715/830 |

* cited by examiner

*Primary Examiner* — Qun Shen

(57) ABSTRACT

A voicemail application includes a first stage having a first voicemail and at a first position, a second stage having a second voicemail and at a second position adjacent to the first position, and a third stage having a third voicemail and at a third position adjacent to the second position. The voicemail application also includes a playback control configured to cause playback of any voicemail associated with any stage at the first position. The voicemail application increases the surface area of a stage as that stage is brought to the first position while the surface area of the stage previously at the first position decreases.

20 Claims, 8 Drawing Sheets

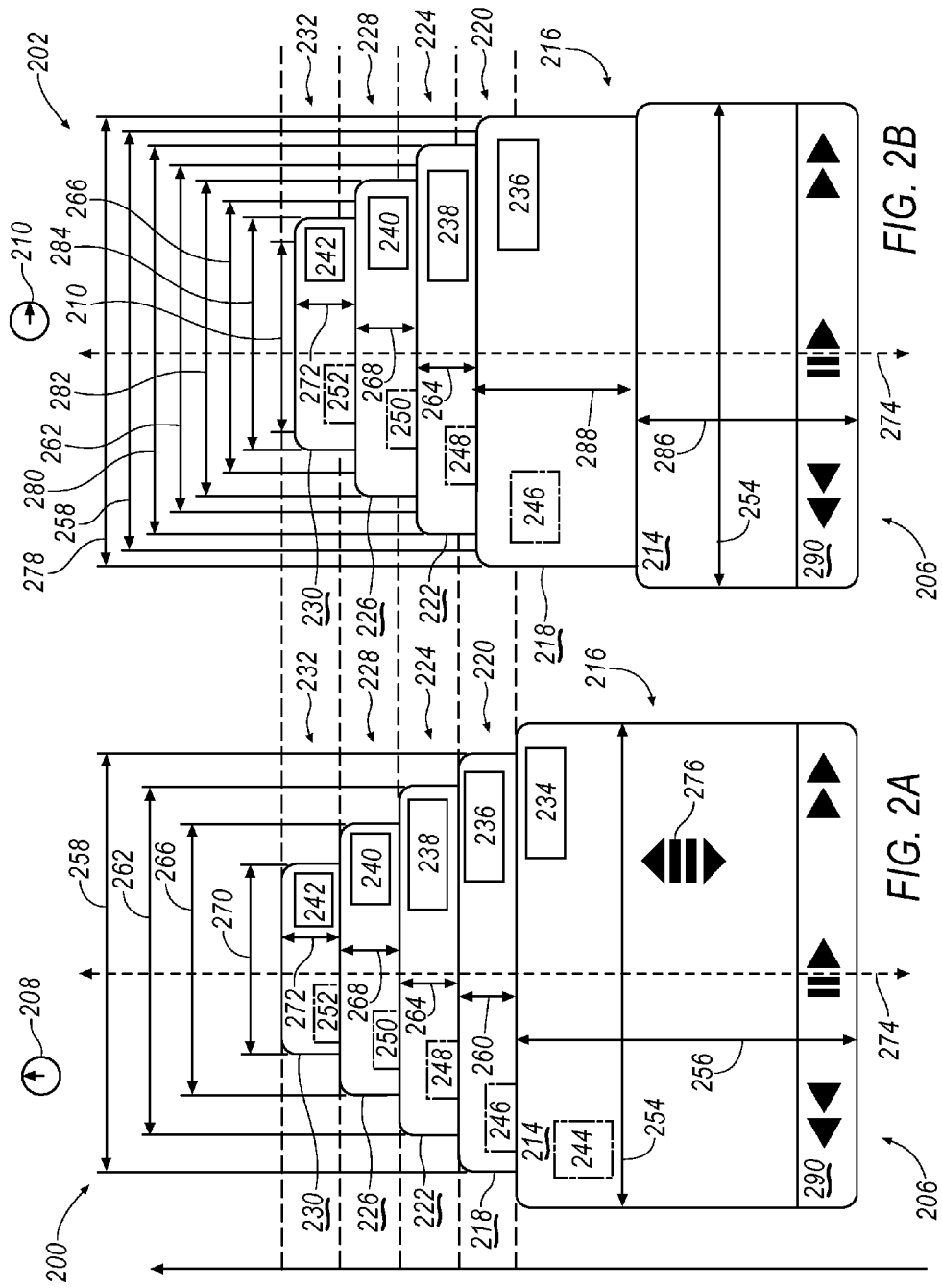

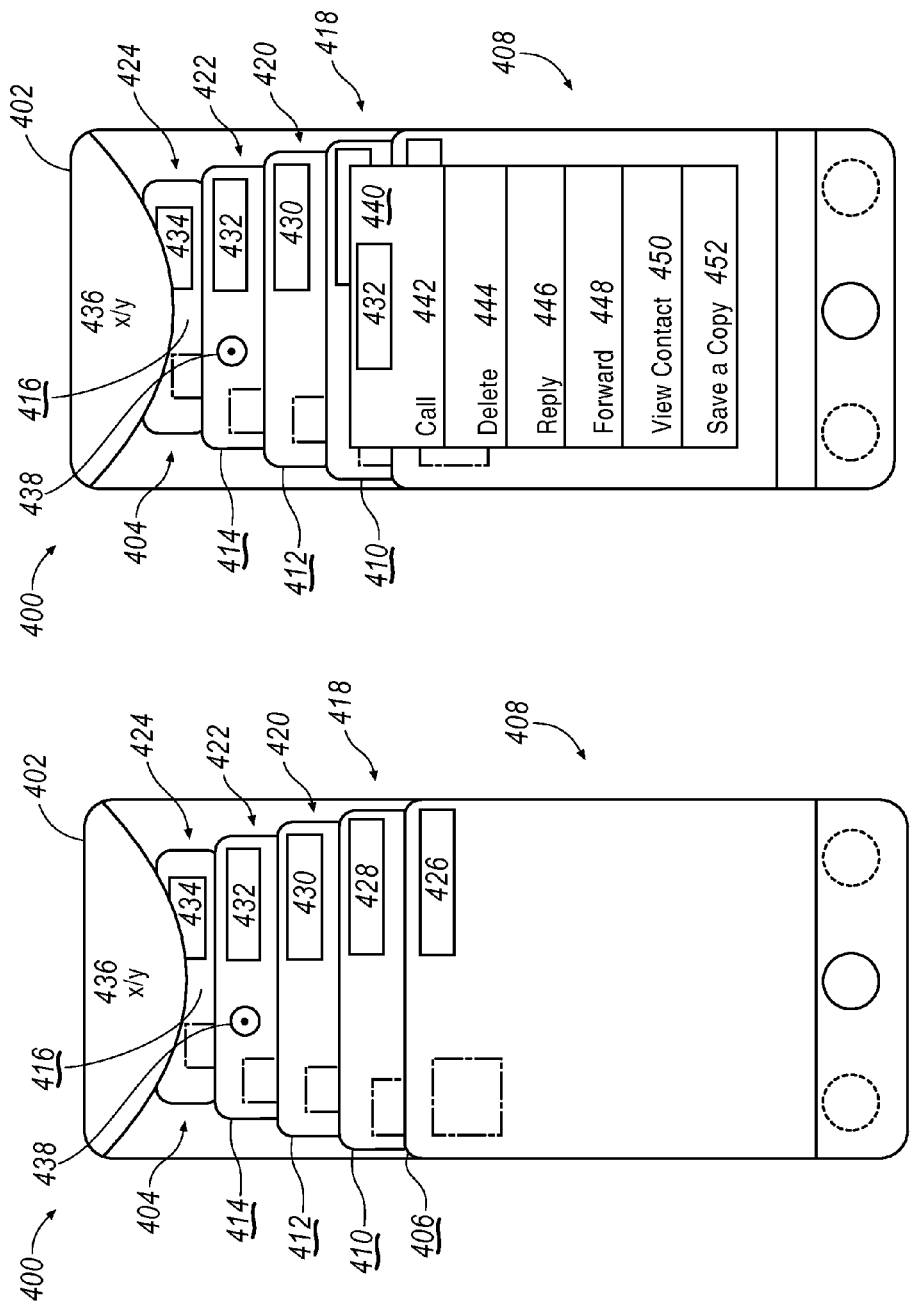

VISUAL VOICE MAIL APPLICATION VARIATIONS

BACKGROUND

Mobile computing devices may include a voicemail application. Such voicemail applications give a user access to voicemails received on the mobile computing device or other computing device. Often, a voicemail application includes functionality that allows the user to play, pause, or otherwise control the playback of the voicemail.

A graphical user interface ("GUI") of a voicemail application presents the "look and feel" of the application to the user. The interface may, for example, simply present the user with a visual opportunity to access the most recent voicemail. On the other hand, a visual interface may present a voicemail log, presenting a user access to voicemails received from a list contacts. A user may then scan the log and choose the appropriate input to listen to a voicemail from a selected contact.

The manner in which a voicemail application functions generally determines how easy it is for a user to interact with the application. Since the demographic of consumers that use mobile devices is wide ranging (e.g., young children to the elderly) and includes users with a wide variety of needs and wants, providing a voicemail application to a user that is both easy and satisfying to use can be difficult.

Thus, there is a need for a system that provides voicemail access in a manner that appeals to a wide variety of individuals.

BRIEF DESCRIPTION OF THE DRAWINGS

FIGS. 2A-C illustrate a voicemail application in operation;

FIGS. 4A-B illustrate exemplary functions of a voicemail application;

DETAILED DESCRIPTION

Figure 1:
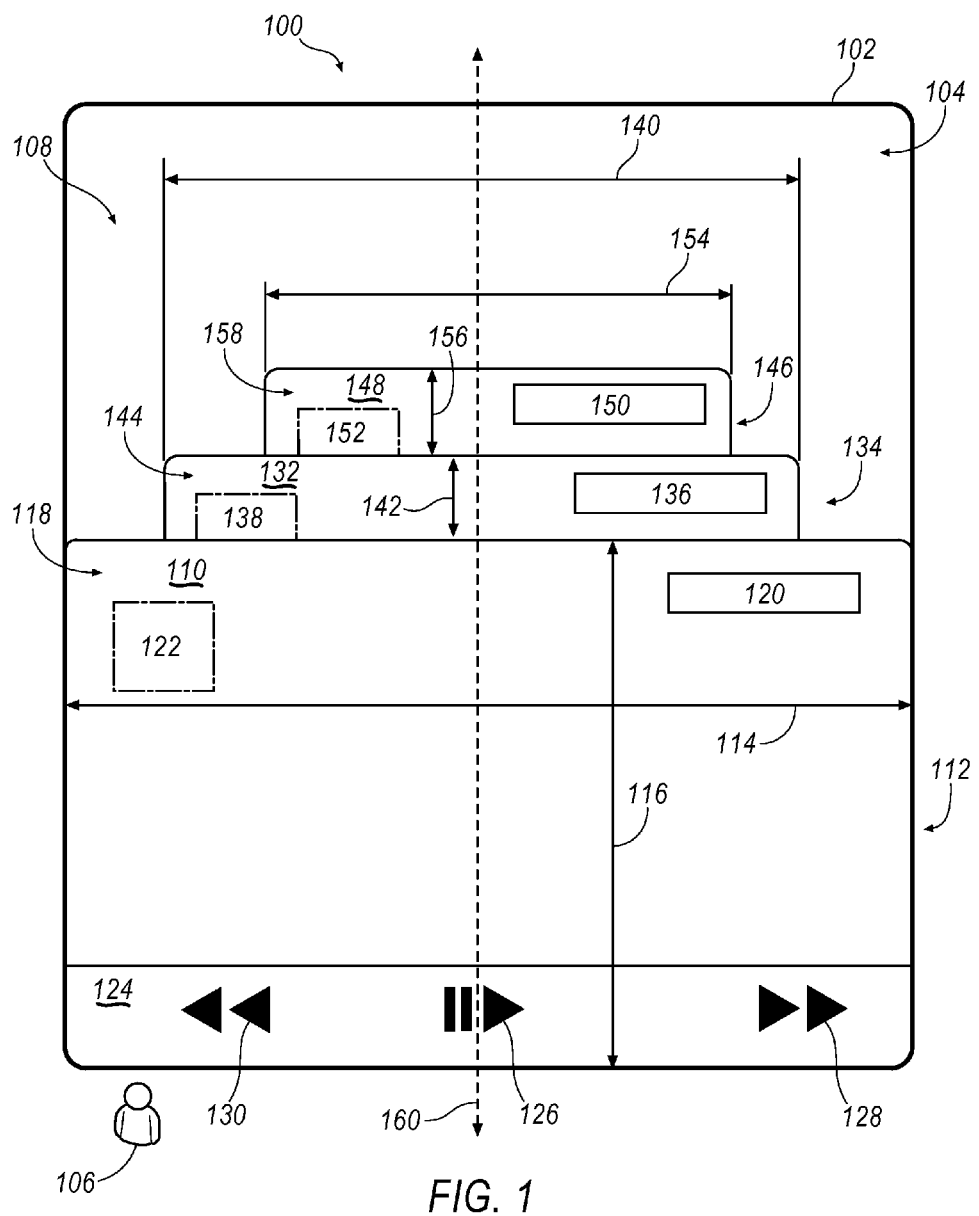
FIG. 1 illustrates an exemplary system having an illustrative voicemail application.

FIG. 1 illustrates an exemplary system 100 for providing voicemails to a user. System 100 includes a mobile device 102 such a mobile phone, tablet, or other mobile computing device. Mobile device 102 may include a graphical user interface ("GUI") that includes a touchscreen 104 or other physical input mechanism such as a physical keyboard or a microphone in the case of audio (e.g., voice prompted) inputs configured to receive a plurality of inputs from a user 106. In the case of touchscreen 104 touch inputs may be used to control applications such as a voicemail application 108. A touch input may include, for example, a swipe, a tap, double-tap, or a long tap (i.e., making contact with the touchscreen 104 for a time period longer than that associated with a tap). As illustrated in FIG. 1, voicemail application 108 is active. It will be appreciated, however, that voicemail application 108 need not be active each time the mobile device 102 is in use.

The voicemail application 108 provides a first stage 110 at a first position 112. When in the form of a quadrilateral, the first stage 110 has a first width 114 and a first height 116 that together can be used to approximate a surface area (i.e., a first surface area) 118 of the first stage 110. The first stage 110 includes a first contact identifier 120 associated with a user contact (not shown). The first contact identifier 120 may, for example, be a proper name, nickname, or business name associated with the user contact. It is contemplated that the user 106 may determine contact identifiers as she or he sees fit. It is also contemplated that the first stage 110 may include a first photo 122 (shown in phantom) associated with the first contact identifier 120. As with the first contact identifier, it is contemplated that the user may determine what first photo 122 he or she wants associated with the first contact identifier 120.

Voicemail application 108 may also include a voicemail interface 124 that is controllable by the user 106. The voicemail interface 124 may include a selectable play/pause graphic 126 allowing the user 106 to play and pause a voicemail message associated with any stage at the first position 112 (e.g., the first stage 110). In addition, the voicemail interface 124 may include other playback functionality such as fast forward capability as represented by a fast forward graphic 128 (shown in phantom) and reverse capability as represented by a rewind graphic 130 (shown in phantom). Other voicemail functionalities may also be included in the voicemail interface 124 (e.g., to skip a message, to immediately transition to a first or last message, or to control volume). It is noted that although graphics (e.g., graphics 126-130) may be controlled via touch input(s), it is also contemplated that physical "button(s)" may also be employed for control in lieu of, or in addition to, touch graphics 126-130.

Voicemail application 108 also includes a second stage 132 at a second position 134 adjacent to the first position 112. The second stage 132 includes a second contact identifier 136, where the second contact identifier 136 may be associated with a second user contact (not shown). The second stage 132 may also include a second contact photo 138 (shown in phantom) associated with the second contact identifier 136.

The second stage 132 has a second width 140 and a second height 142 when in the form of a quadrilateral, that together may be used to approximate a surface area (i.e., a second surface area) 144 of the second stage 132. It is noted that in the illustrated exemplary system 100 the second surface area 144 is less than the first surface area 118.

At a third position 146 adjacent to the second position 134 is a third stage 148 that includes a third contact identifier 150. The third contact identifier 150 may be associated with a third contact (not shown) different than the first and second contacts. Third stage 148 may also include a third contact photo 152 (shown in phantom) associated with the third contact identifier 150.

Once again, when in the form of a quadrilateral, the third stage 148 has a third width 154 and a third height 156 that together may be used to approximate a surface area (i.e., a third surface area) 158 of the third stage 148. In the illustrated example, the third stage 148 has a third surface area 158 that is less than the second surface area 144.

For spatial reference purposes, a hypothetical bisecting axis or line 160 is shown. Bisecting axis 160 substantially bisects the first, second, and third stages 110, 132, and 148, respectively. Accordingly, the second stage 132 is substantially centered with respect first stage 110 as well as with respect to third stage 148. It is noted that though three stages 110, 132, 148 are shown, it is contemplated that the voicemail application 108 may display additional stages (not shown).

Though not shown, but as will be discussed below with respect to FIGS. 2A-C, one or more inputs (e.g., a touch input) may be employed to scroll or move the stages 110, 132, 142 to different positions. For example, one or more inputs may be employed to scroll or move the third stage 148 to the second position 134 while moving the second stage 132 to the first position 112. Since the voicemail interface 124 allows the user 106 to control playback of a voicemail associated with any stage at the first position 112, the user 106 would then be able to play a voicemail associated with the second stage 132 after it is brought to the first position 112. Accordingly, the user 106 determines which stage (e.g., first, second, or third stages 110, 132, 148, respectively) will be placed at the first position 112. As such, the user 106 is able to select or choose voicemails for playback. Since voicemail playback is associated with stages at the first position 112, stages at the first position 112 may be considered active stages.

Though the exemplary stages 110, 132, 148 depicted in FIG. 1 have a quadrilateral-type shape, other stage shapes are contemplated. For example, stages such as stages 110, 132, 148 of FIG. 1 may have a hemispherical-like shape. Further, the general shape of each stage need not be identical.

In addition, the shape and/or appearance of one or more of the stages 110, 132, 148 may be manipulated to serve as visual indicator(s) to the user 106. That is, the stage shape and/or appearance of one or more stages may be altered to visually stand out to the user 106. For example, a stage corner may appear folded to represent a well-used contact (i.e., a contact that left greater than "X" voicemails in time period "Y").

Visual indicators may also be manifested via color-coding. For example, stages (or portions thereof) may be color-coded to show a distinction between heard and unheard voicemails or, for example, between voicemails left by family, friends, and colleagues. It is contemplated that the user 106 may have at least some control over the voicemail application 108 to choose the meaning behind such visual indicators (e.g., an orange stage represents an unheard voicemail or that an orange stage represents a voicemail from a colleague).

Figure 2C:
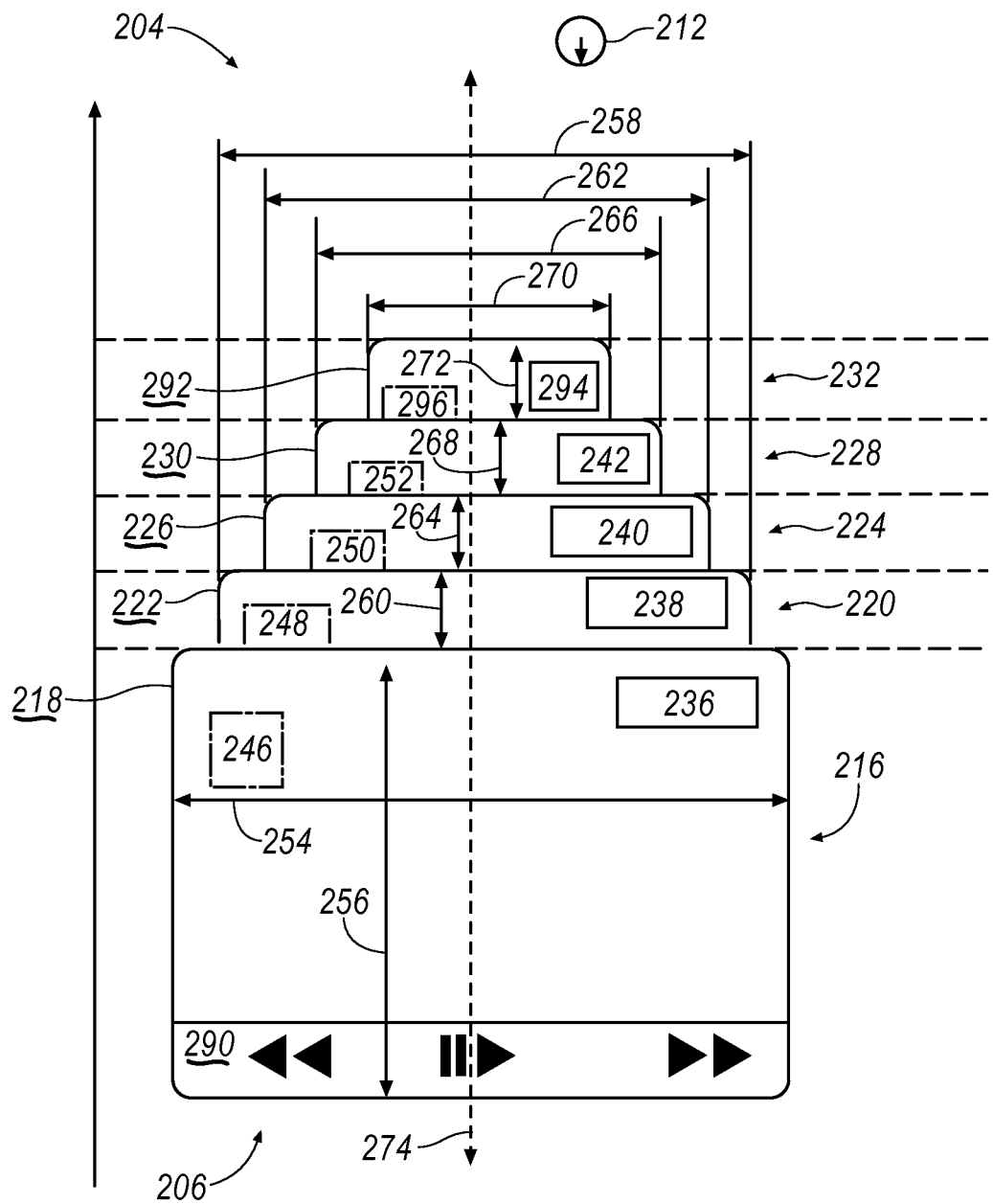

With reference now to FIGS. 2A-C, exemplary screenshots 200, 202, 204 are shown illustrating a voicemail application 206 in operation. The first screenshot 200 of FIG. 2A is at a first instance in time 208, the second screenshot 202 of FIG. 2B is at a second instance in time 210 later than the first instance in time 208, and the third screenshot 204 of FIG. 2C is at a third instance in time 212 later than the second instance in time 210. The exemplary screenshots 200-204 do not necessarily depict "portrait" screenshots. For example, the exemplary screenshots may depict "landscape" screenshots.

The first screenshot 200 of FIG. 2A depicts the voicemail application 206 with a first stage 214 at a first position 216, a second stage 218 at a second position 220, a third stage 222 at a third position 224, a fourth stage 226 at a fourth position 228, and a fifth stage 230 at a fifth position 232.

The first stage 214 includes a first contact identifier 234, the second stage 218 includes a second contact identifier 236, and the remaining stages 222, 226, 230 each include a respective contact identifier 238, 240, and 242. Each contact identifier 234-242 may be associated with a unique user contact. However, it is contemplated that two or more contact identifiers 234-242 may be associated with a same user contact. For example, a user contact associated with the first contact identifier 234 may be associated with a user group that includes other friends or colleagues. As such, additional contact identifiers (not shown) associated with the other fiends or colleagues in that group may, for example, also be displayed on the first stage 214 along with the first contact identifier 234.

In addition to conveying contact information (e.g., a contact name) to the user, the contact identifiers 234-242 may be color-coded so as to notify the user if the voicemail in queue has been heard or unheard. For example, a contact identifier color-coded orange may indicate to the user that the associated voicemail has not yet been heard. Alternatively, instead of color coding the contact identifiers 234-242, other portions of the stages 214, 218, 222, 226, 239 may be color-coded to visually alert the user as to which voicemails in queue have been heard and which have not been heard.

In addition to color-coding and displaying contact identifiers, it is contemplated that each stage 214, 218, 222, 226, 230 may include at least a portion of a photo contact photo 244, 246, 248, 250, 252 (each shown in phantom) respectively associated with each contact identifier 234-242.

The dimensions, and therefore surface areas, of the stages 214, 218, 222, 226, 230 are determined by their positions 216, 220, 224, 228, 232. The stage at the first position 216 (e.g., first stage 214) has a first width 254 and a first height 256. The stage at the second position 220 (e.g., second stage 218) has a second width 258 and second height 260. The stage at the third position 224 (e.g., third stage 222) has a third width 262 and a third height 264. Further, the stage at the fourth position 228 (e.g., fourth stage 226) has a fourth width 266 and a fourth height 268, and the stage at the fifth position 232 (e.g., fifth stage 230) has a fifth width 270 and a fifth height 272. Though the second through fifth heights 260, 264, 268, 272 are substantially equal, this need not be the case. It is contemplated that one or more of these heights 260, 264, 268, 272 may vary among a range that includes heights less than first height 256.

In addition, though the heights 260, 264, 268, 272 at the second, third, fourth, and fifth positions 220, 224, 228, 232, respectively, are substantially the same, the widths 254, 258, 262, 266, 270 vary. For example, second width 258 is less than first width 254, third width 262 is less than the second width 258, fourth width 266 is less than the third width 262, and fifth width 270 is less than third width 266. As such, the first screenshot 200 gives the user a sense of perspective. While perspective is shown in the exemplary approach based on difference of width, perspective may also be shown based on a difference in height, a combination of both width and height, or other different dimensional relationships such as if quadrilaterals are not used.

An imaginary or hypothetical bisecting line 274 is shown, thus illustrating the second stage 218 is substantially centered with respect to first stage 214, the third stage 222 is substantially centered with respect to second stage 218, the fourth stage 226 is substantially centered with respect to the third stage 222, and the fifth stage 230 is substantially centered with respect to the fourth stage 226.

At least in part due to the diminishing widths 254, 258, 262, 266, 270 of respective stages 214, 218, 222, 226, 230, the second stage 218 appears to be behind the first stage 214, the third stage 222 appears to be behind the second stage 218, the fourth stage 226 appears to be behind the third stage 222, and the fifth stage 230 appears to be behind the fourth stage 226. It is noted, however, that other visual cues may be employed to enhance perspective. For example, the transparency of the stages 214, 218, 222, 226, 230 may vary depending on stage position. That is, if for example a linear array of five stages is displayed as shown in FIGS. 2A-C, a stage at the fifth position 232 may be more transparent than a stage at the fourth position 228, a stage at the fourth position 228 may be more transparent than a stage at the third position 224, a stage at the third position 224 may be more transparent than a stage at the second position 220, and a stage at the second position 220 may be more transparent than a stage at the first position 216. By varying stage transparency, a sense of stage depth may be enhanced. It is noted however, that a "flat perspective" may instead be employed while maintaining the stage surface areas discussed above. According to such an example, the stages 214, 218, 222, 226, 230 may have the appearance of being on the same plane.

It is contemplated that a finger swipe 276 may cause the stages 214, 218, 222, 226, 230 to move. Other types of inputs are also contemplated. For example, a tap (not shown) on a particular stage 218, 222, 226, 230 may cause that stage to move to the first position 216.

With reference now to FIG. 2B, the second screenshot 202 at the second instance in time 210 illustrates the stages 214, 218, 222, 226, 230 of the voicemail application 206 in transition after the input (e.g., exemplary finger swipe 276) of FIG. 2A. As shown in FIG. 2B, the second stage 218 is in transition as it moves to encompass the first position 216. During transition, in the illustrated approach the second stage width expands (i.e., increases) towards the first width 254 of the first position 216, as shown by a first transition width 278 in the second screenshot 202. Further, third stage width increases towards second width 258 of the second position 220, as seen by a second transition width 280, fourth stage width increases towards to the third width 262 as seen by a third transition width 282, and fifth stage width increases towards the fourth width 266 as seen by a fourth transition width 284.

In a similar manner, the surface area of the fifth stage 230 increases as the fifth stage 230 moves to the fourth position 228, the surface area of the fourth stage 226 increases as the fourth stage 226 moves to the third position 224, and the surface area of the third stage 222 increases as the third stage 222 moves to the second position 220.

Not only do the widths change in the exemplary system 100, but as noted above other dimensional relationships such as heights may also be adjusted. In each case, however, the surface areas change during transition. Using FIG. 2C as an example, a first stage height 286 is shown decreasing as a second stage height 288 increases. As illustrated in FIG. 2C, it is contemplated that the first stage height 286 will decrease to zero as the transition completes or ends. According the surface area of the second stage 218 increases as the first stage 218 moves to the first position 216, while the surface area of the first stage 214 decreases.

Continuing with reference to the third screenshot 204 of FIG. 2C, the voicemail application 206 is shown as transition ends. Accordingly, since the second stage 218 has moved to the first position 216, a user may now play a voicemail associated with the second contact identifier 236 via a voicemail interface 290. Not only has the second stage 218 moved, the third stage 222 has moved to the second position 220, the fourth stage 226 has moved to the third position 224, the fifth stage 230 has moved to the fourth position 228, and the first stage 214 has disappeared.

It is contemplated that, if the user has additional voicemails, a sixth stage 292 having a sixth contact identifier 294 may appear in the fifth position 232. Further, the sixth stage 292 may also include at least a portion of a sixth photo 296 (shown in phantom). Alternatively, the first stage 214 may instead appear at the fifth position 232.

Though the stages 218, 222, 226, 230, 292 are shown substantially centered with respect to the bisecting line 264, it is contemplated that one or more stages may be offset from the bisecting line 264. For example, the voicemail application 206 may cause a voicemail stage associated with a particular user contact to be offset (not shown) with respect to the bisecting line 274. As such, the visual incongruity may further alert the user that a voicemail from that user contact is in queue.

As illustrated in FIGS. 2A-C, the voicemail application 206 has the appearance of a rotating file-type device or "revolving" cards as the finger swipe 276 (i.e., a touch input) puts the stages 214, 218, 222, 226, 230 in motion. Via an input such as the finger swipe 276, the user can determine which stage, along with the corresponding contact identifier, will be placed in the first position 216. In this manner, the user is able to select which voicemail to listen to via voicemail interface 290.

Figure 3C:
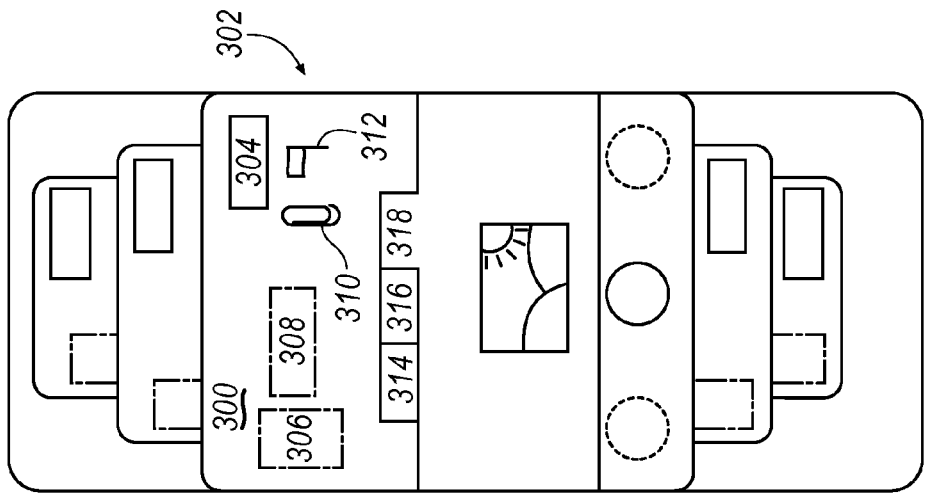
FIGS. 3A-C illustrate exemplary functions of an active stage associated with a voicemail application.
Figure 3B:
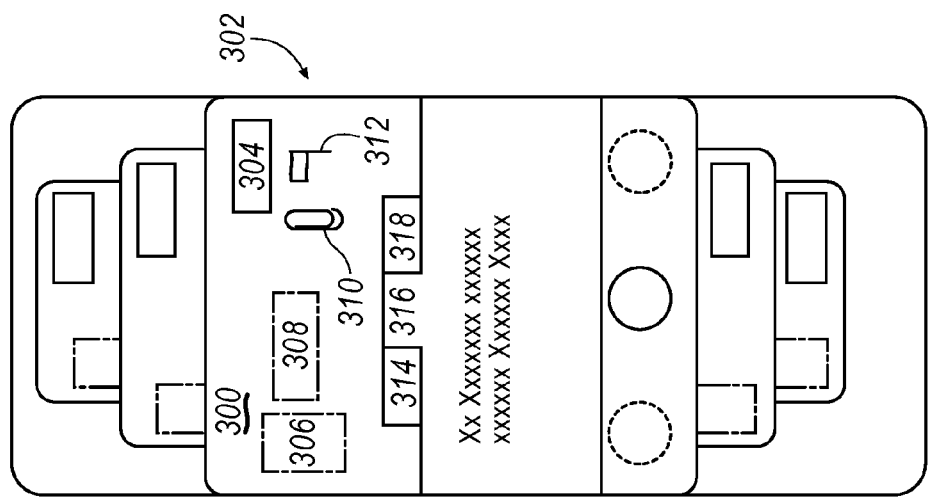
Figure 3A:
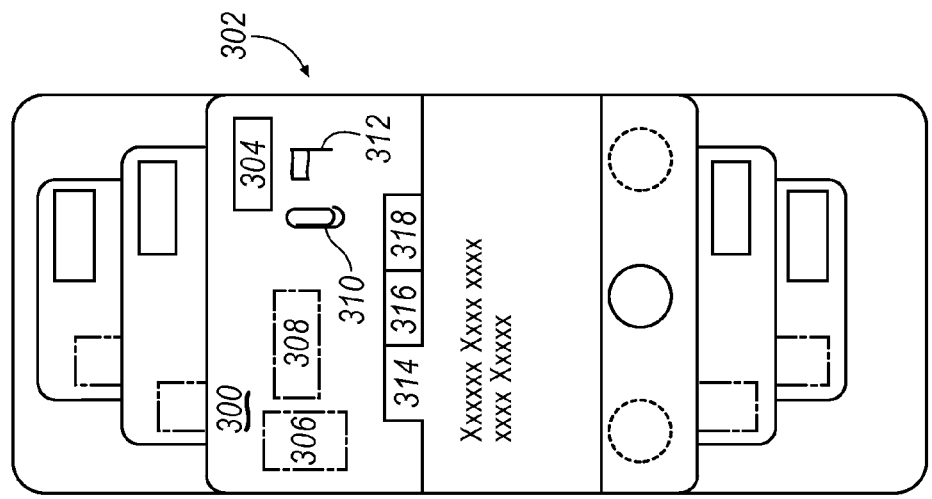

Referring now to FIGS. 3A-C, exemplary functionality of an active stage 300 at a first position 302 is shown. The active stage 300 includes a contact identifier 304 to identify the contact that left a message, a contact photo 306, an indicator 308 to provide information on such things as the time and/or date the voicemail was left or received, an attachment link 310 to take the user to attachments that may be saved, and a priority indicator 312 to indicate the priority of the voicemail.

Some functionality (e.g., date and/or time indicator 308, attachment link 310, and priority indicator 312) may be depicted automatically or a user may determine that which is shown. For example, a user may, based on a prior input, cause the voicemail application to automatically set the priority indicator 312 each time a stage associated with a particular contact or group of contacts is shown. Accordingly, one or more stage may depict a set priority flag if the stage is associated with the particular contact or group of contacts (e.g., each stage associated with direct family has a priority flag). Alternatively, the user may, for example, manually set the priority indicator 312 while viewing a particular stage.

It is also contemplated that the active stage 300 may include at least a subset of a memo function 314 to allow the user to input a memo (e.g., orally or by way of a touch mechanism) pertaining to the contact associated with the contact identifier 304, a transcription function 316 that provides a textual transcript of the voicemail to the user, and an image function 318 that provides image(s) associated with the contact identifier 304 to the user.

As depicted in FIGS. 3A-C, various types of functionality (e.g., date and/or time indicator 308, attachment link 310, and priority indicator 312) are depicted on the active stage 300, but not other stages. Though not shown, it is contemplated that these or other functionalities may also be provided on other stages not in the active or first position 302. For example, a priority indicator (e.g., priority indicator 312) may be shown on other non-active stages as well (i.e., stages not at the first position 302).

It is contemplated that, based on user preference, the user may determine what voicemails are shown or the order in which voicemail stages are shown. For example, based on a user setting, the voicemail application may portray voicemails having a "set" priority indicator associated therewith in a sequence. That is, based on a user setting, the voicemail application may depict a sequence of stages (starting with the active stage 300) having a "set" or "active" priority indicator 312. It is noted, however, that such control of the order in which the stages are shown need not be based on the priority indicator 312. For example, based on a user setting, a user could determine that the stage order be based on a "set" or "active" attachment indicator (e.g., attachment link 310), or be based on heard or unheard voicemails.

Accordingly, the order in which the voicemail application displays the stages need not be based on the chronological order in which the voicemails were received. That is, a user may determine the sequence in which the stages are displayed. As discussed above, the order may be based on priority indicators, attachments, or other details chosen by the user.

With reference now to FIGS. 4A-B, exemplary functionality of a voicemail application 400 on a mobile device 402 is illustrated. Mobile computing device 402 includes a GUI in the form of a touchscreen 404 that presents the voicemail application 400 and receives user based input. The voicemail application 400 may include an active stage 406 at a first position 408 and a plurality of additional stage 410, 412, 414, 416. The stages 410-416 are respectively at a second position 418, a third position 420, a fourth position 422, and a fifth position 424. Further, each stage 406, 410-416 presents a respective contact identifier 426, 428, 430, 432, 434 to the user.

Voicemail application 400 may also include a voicemail indicator 436. The voicemail indicator 436 indicates to the user the voicemail, which is currently presented at the first position 408 as well as the total amount of saved voicemails. For example, the voicemail indicator 436 may indicate that voicemail three of seven total voicemails (e.g., "Voicemail 3/7" or "3/7") is currently presented in the first position 408. As with other functionality of the voicemail application 400, it is contemplated that the user may be able to exert some control over the voicemail indicator functionality. For example, based on a user setting, the voicemail indicator 436 may be associated with voicemails or contacts having a set priority indicator (e.g., priority indicator 312 of FIGS. 3A-C). In such an instance, a voicemail indicator of, for example, "3/5" may indicate that "priority" voicemail three of five total "priority" voicemails (i.e., five voicemails having a priority indicator selected) is currently presented in the first position.

As another example of user control, the voicemail application 400 may also allow a user to manipulate contact information not currently presented at the first position 408. For example, via a touch input 438 (FIG. 4A) at the fourth position 422, the mobile device 402 may present a function menu 440 (FIG. 4B) to the user. The menu 440 presents functionality associated with stage 414. Accordingly, the menu 440 includes the associated contact identifier 432 along with a plurality of exemplary functions 442, 444, 446, 448, 450, 452. Each function is associated with the contact identifier 432. For example, a user may employ the "Call" graphic 442 to call the contact, the "Delete" graphic 444 to delete the contact voicemail, the "Reply" graphic 446 to reply to the contact, the "Forward" graphic 448 to forward the contact's voicemail to another contact, the "View Contact" graphic 450 to view detailed contact information, and the "Save a Copy" graphic 452 to save or store a copy of the contact's voicemail. Additional, or alternative, functionality may also be presented to the user via menu 440. Further, the functionality presented in the menu 440 need not be the same for each stage. For example, based on a user setting, the functionality presented in the menu 440 may vary depending on the user contact associated with the stage.

It is contemplated that the user may engage with the menu 440 via touch input(s) (not shown), via physical button(s) (also not shown), or orally such as by way of a microphone (not shown) on the mobile device 402. Further, the user may employ an input at other stages (e.g., stages 406, 410, 412, 416) to bring up a related menu.

Though the voicemail applications in FIGS. 2-4B are generally depicted in a "portrait" orientation, it is contemplated that the screen may be tilted from the vertical so that the voicemail application may also be viewed in a "landscape" orientation. In such an example, the stages may still appear as a linear array along a vertical axis, or instead appear as a linear array along a horizontal axis. Indeed, it is contemplated that the voicemail application may be presented as a linear array along other axes between the vertical and horizontal depending on the screen orientation.

Figure 5:
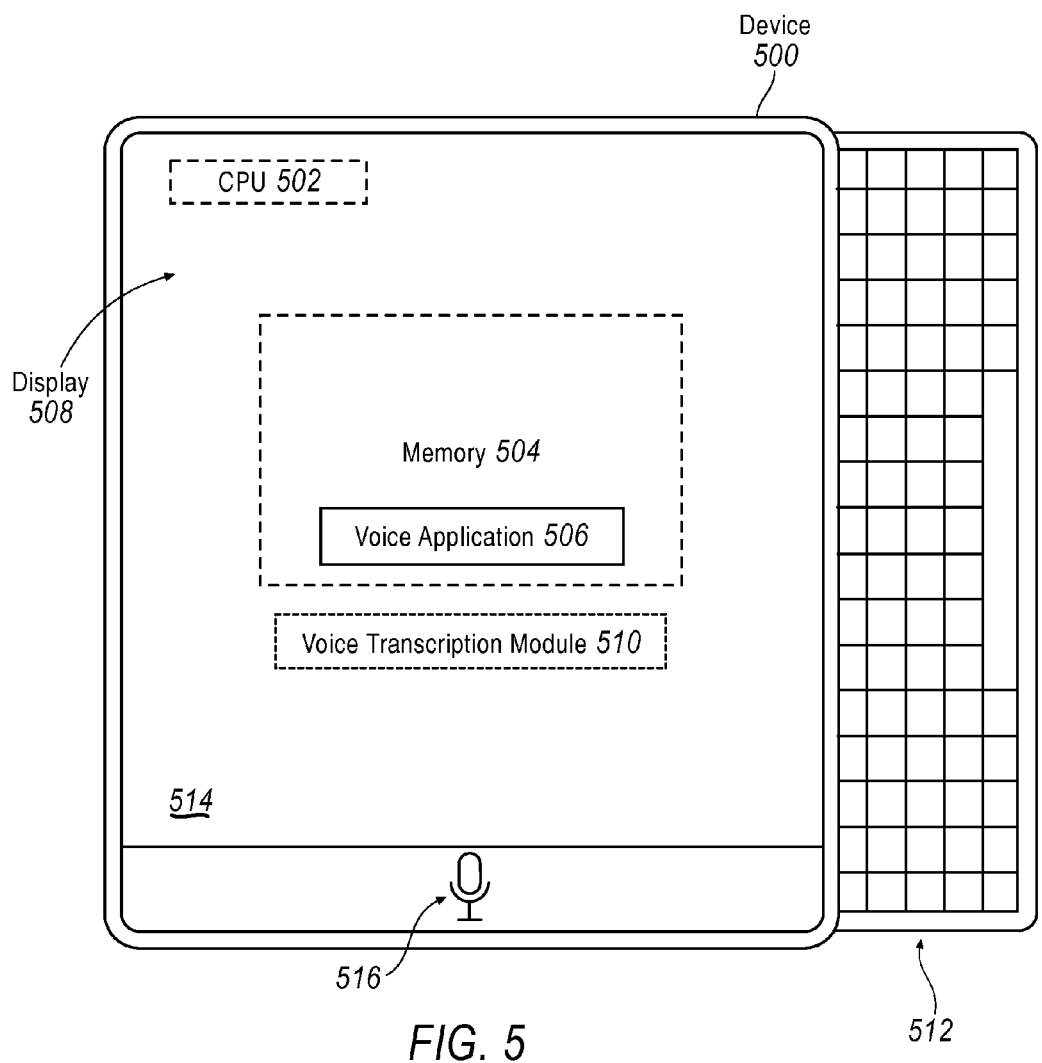
FIG. 5 illustrates an exemplary device employing a voicemail application.

Referring now to FIG. 5, an exemplary mobile device 500 is shown having capabilities described herein. Computing devices such as the mobile devices discussed herein (e.g., mobile device 500) include a central processing unit (CPU) 502, a memory 504 having a voicemail application 506 (e.g., voicemail applications 108, 206, and 400) stored thereon, a display 508, an input mechanism (e.g., touchscreen 104 and 404), and a voice transcription module 510. The voice transcription module 510 may be configured to transcribe voicemails into text that may be provided to the user via the voicemail application 506 (see e.g., transcription function 316 of FIGS. 3A-C).

The input mechanism may, for example, include a keyboard 512, a touchscreen 514 and/or a microphone 516. Other examples, not shown, are also contemplated. The one or more input mechanisms 512-516 may be employed for general control of the mobile computing device 500 or be utilized for at least partial control of the voicemail application 506. For example, the keyboard 512 and/or touchscreen 514 may, for example, be employed with a memo function (see e.g., the memo function 314 of FIGS. 3A-C) to input a memo into the voicemail application 506 of FIG. 5. In addition, or alternatively, the microphone 516 may be utilized in conjunction with a memo function to input a memo into the voicemail application 506. Such a memo may, for example, be a voice memo or a transcription of a voice memo if the microphone 516 is employed in conjunction with the transcription module 510.

As noted, the input mechanism(s) (e.g., the keyboard 512, the touchscreen 514, and/or the microphone 516) may be employed for a variety of tasks associated with the exemplary mobile computing device 500 that are different than memo inputs. For example, the microphone 516 may be utilized to manipulate the voicemail application 506. An exemplary voice command such as "scroll down" may be received via the microphone 516 to cause the voicemail application 506 to scroll or move a particular stage (e.g., stage 218, 222, 226 or 230 of FIG. 2A) into the first position, thus presenting such stage as an active stage.

Figure 6A:
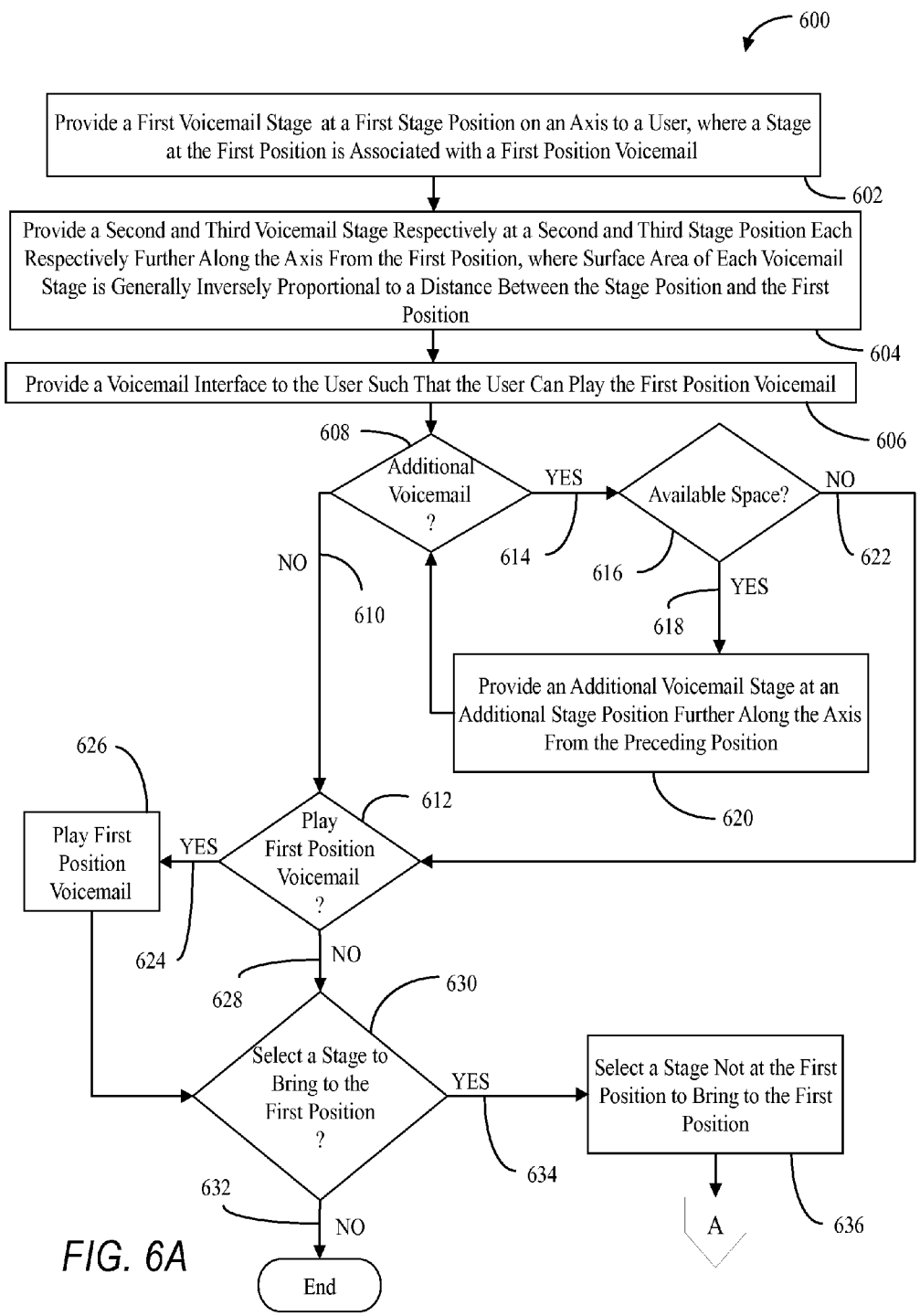
FIGS. 6A-B depict a flowchart that illustrates an exemplary technique for providing voicemail access to a user.
Figure 6B:
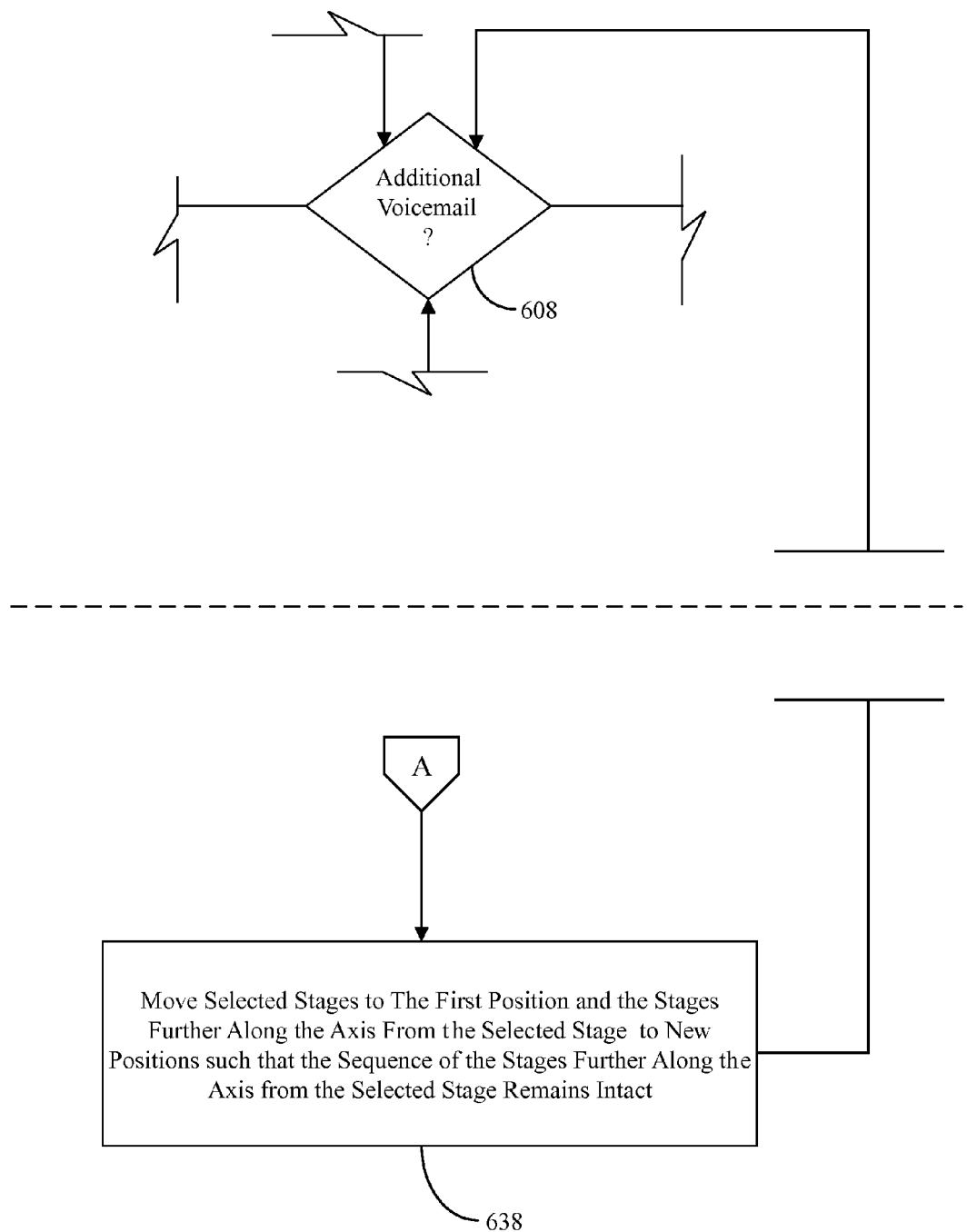

With reference now to FIGS. 6A-B, a flowchart illustrates an exemplary technique 600 for providing voicemail access to a user. Process control begins at block 602 of FIG. 6A, where an application such as a voicemail application provides a first voicemail stage at a first stage position on an axis to a user. The first stage is provided or presented at the first position and is associated with a first position voicemail. Process control then proceeds to block 604 to provide a second and third voicemail stage respectively at a second and third stage position along the axis. The second and third stage positions are respectively further along the axis from the first position. Further, the surface area of each voicemail stage (i.e., the first, second, and third voicemail stages) is generally inversely proportional to a distance between the stage position and the first position (see e.g., stages 214, 218, 222, 226 and 230 of FIG. 2A). In other words, respective voicemail stage surface areas decrease as their respective distance from the first position increases.

It is contemplated that each voicemail stage could be provided to give a sense of perspective. As such, the second stage may appear to be behind the first stage while the third stage appears to be behind the second stage.

Still referring to FIG. 6A, as the first, second, and third stages are provided, process control proceeds to block 606, where a voicemail interface is provided to the user and allows the user to play the first position voicemail if desired. It is noted that the voicemail interface and each voicemail stage may be provided to the user at the same time. Alternatively, the timing at which the voicemail interface and each of the first thru third voicemail stages may be varied to provide a sense of motion.

Process control then proceeds to decision block 608 to determine if there are additional voicemails that may be associated with additional stages. If there is not an additional voicemail 610, process control proceeds to decision block 612 to determine whether or not to play the first position voicemail. On the other hand, if it is determined that there is an additional voicemail 614, process control proceeds to decision block 616. At decision block 616, it is determined whether or not there is available space for an additional stage to be associated with the additional voicemail. In other words, it is determined whether or not there is sufficient space available on the computing device screen to provide an additional stage hosting the additional voicemail. It is contemplated that this decision may be an aesthetic design decision and controlled by a voicemail application. Additionally, the user may have at least some control as to how many stages are provided. For example, based on a user setting, the user may determine how many stages are to be displayed in the available space. In such an instance, the voicemail application may, for example, allocate screen space for six stages to be presented. A user, however, may determine that, for example, only five stages are to be presented in the available space. As such, the determination made at decision block 616 may be based in part on a user selected setting.

If there is additional available stage space 618, process control proceeds to block 620 and an additional voicemail stage is provided at an additional stage position. The additional stage position is further along the axis from the preceding position. Accordingly, since the surface area of each stage is generally inversely proportional to a distance between the stage position and the first position, this additional voicemail stage has a surface area less than the other surface areas of the other stages. Process control then proceeds once again to decision block 608 to determine if there is an additional voicemail to be associated with a stage.

If, on the other hand, it is determined at decision block 616 that there is not available space 622 for an additional stage, process control proceeds once again to decision block 612.

At decision block 612, it is determined whether or not to play a first position voicemail. A user, for example, may utilize a touch input, or some other type of input, to cause the mobile computing device to play 622 the first position voicemail. As such, process control proceeds to block 626, where the first position voicemail is played for the user.

Alternatively, it may be determined not to play 628 the first position voicemail. Such a determination may, for example, be based on user choice, or the absence thereof (i.e., lack of user input to cause the playback of the first position voicemail). If it is determined not to play 628 the first position voicemail, process control proceeds to decision block 630, where it is determined whether or not a different stage will be brought to the first position. Such a determination may, for example, be made by the user. As an alternate example, such a decision may be based on computer programming. For example, the voicemail application may be configured to automatically display, play, or read voicemails in a predetermined sequence. As such, the voicemail application would automatically determine whether or not to select another stage to be brought to the first position.

If another stage is not selected 632, process control proceeds to an end. It is noted that proceeding to an end does not necessarily mean that the voicemail application has closed. Rather, "End" may simply refer to an end for exemplary technique 600 until a user provides an input to the voicemail application (e.g., selecting a stage to bring to the first position 634).

Referring back to decision block 630, if it is determined that another stage will be selected 634, process control proceeds to block 636, where a stage not currently at the first position is selected to be brought to the first position. The user may employ a touch input on a particular stage to select that stage. For example, the user may touch the second, third, or other stage to make the selection. Other inputs may also be used. For example, a voice prompt or gesture may be employed to select a stage to be brought to the first position. That is, the user may, for example, provide a voice prompt to "select third stage" or provide a gesture (e.g., a hand motion) to do the same. Alternatively, the voicemail or other application may select the stage to be brought to the first position.

Upon selection of the stage at block 636, exemplary technique 600 continues as illustrated in FIG. 6B. After selection of the new stage to be brought to the first position, process control proceeds to block 638, where the selected stage is brought into the first position. Additionally, other stages further along the axis from the selected stage are also brought to new positions such that the sequence of these stages further along the axis from the selected stage remains intact. For example, if the user selects the stage at the second position at block 636, the surface area of the selected stage expands as it is brought to the first (or active) position. Additionally, the stage at the third position expands as it is brought to the second position. If there are other stages displayed, these stages move to the new positions in a logical fashion to keep their sequence intact. Since stage position determines voicemail stage surface area, regardless of stage shape, the stages other than the current stage at the first position expand as they are moved into their new positions. However, as the selected stage is brought into the first position, the surface area of the current first position stage decreases. FIGS. 2A-C and the accompanying detailed description above illustrate an example of how the surface areas of such stages may change as a new stage is brought to the first position.

As the new stages are brought to their new positions in an animated fashion using the exemplary approach, process control proceeds back to decision block 608 of FIG. 6A, where it is determined whether or not an additional voicemail is available for access. If it is determined that an additional voicemail is available 614 (FIG. 6A) and it is determined 616 that there is available space 618 for an additional stage, the new stage associated with the additional voicemail is provided at block 620. Accordingly, to serve as an example, the mobile computing device may display five stages along an axis at five different sequential positions. The surface area of each stage is generally determined by their distance from the first position. That is, the first stage generally has the largest surface area, while the surface areas of the remaining stages decrease in a manner generally dependent on their position. A user may, for example, select the third stage to be brought to the first position. Since it is contemplated that the stages generally move in unison, the third, fourth, and fifth stages expand as they are brought to their new positions (i.e., as the third stage is brought to the first position, the fourth stage is brought to the second position, and the five stage is brought to the third position, keeping the sequence intact). If it is determined that additional voicemails are available 614 and there is available space 618 for associated voicemails stages, additional stages may be brought into positions four and five. These additional voicemails stages could be, for example, the first and second voicemail stages that were previously at the first and second positions (i.e., prior to the transition of the third voicemail stage to the first position). Alternatively, the additional stages could be voicemail stages not previously displayed or a combination of a previously displayed voicemail stage and a voicemail stage not previously displayed. It is noted that, if there are not additional voicemails 610, new voicemails stages for positions four and five along the axis need not be provided.

As discussed above, the voicemail application may be configured to display three or more voicemail stages, where the voicemail stage provided at the first position is an active stage. By using an identifier (e.g., a contact identifier), each stage is visibly associated with a user contact. The active stage at the first position provides the user access to contact information and/or a voicemail associated with the stage. The surface areas of the remaining stages decrease as their distance from the first position increases. The first voicemail stage appears to be in the foreground as the remaining stages appear to be positioned at various perspectives in the background. As such, the stage at the second position appears to be behind the stage in the first position while the stage at the third position appears to be behind the stage in the second position, and so on. Since the stages expand, regardless of shape, as they transition to positions closer to the first position, the voicemail application provides a "roller-deck" like appearance to the user during the transition.

The voicemail application may alternatively in a different exemplary approach provide a "flat" perspective. As such, though the surface area of the voicemail stages would still be determined by the stage position, each stage would appear to be on the same plane. Other aesthetics beyond the "flat" or "perspective" aesthetic are also contemplated.

With reference now back to at least FIGS. 1, 4A-B, and 5 discussed above, the exemplary system 100 of FIG. 1 and devices 102, 402, 500, respectively of FIGS. 1, 4A-B, and 5, may be any computing system and/or device that includes a processor (e.g., CPU 502 of FIG. 5) and a memory (e.g., memory 504). Computing systems and/or devices generally include computer-executable instructions, where the instructions may be executable by one or more computing devices such as those listed below. Computer-executable instructions may be compiled or interpreted from computer programs created using a variety of programming languages and/or technologies, including, without limitation, and either alone or in combination, Java™, C, C++, Visual Basic, Java Script, Perl, etc. The exemplary system 100 and items therein (e.g., devices 102, 402) may take many different forms and include multiple and/or alternate components. While exemplary systems, devices, and modules are shown in the Figures, the exemplary components illustrated in the Figures are not intended to be limiting. Indeed, additional or alternative components and/or implementations may be used, and thus the above examples should not be construed as limiting.

In general, computing systems and/or devices (e.g., devices 102 and 402) may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing systems and/or devices include, without limitation, cell phones, smart-phones, super-phones, tablet computers, next generation portable devices, handheld computers, secure voice communication equipment, or some other computing system and/or device.

Further, the processor or the microprocessor (e.g., CPUs 502) of computing systems and/or devices receives instructions from the memory (e.g., memory 504) and executes these instructions, thereby performing one or more processes, including one or more of the processes described herein. Such instructions and other data may be stored and transmitted using a variety of computer-readable mediums (e.g., memory 504).

A CPU 502 may include processes comprised from any hardware, software, or combination of hardware or software that carries out instructions of a computer programs by performing logical and arithmetical calculations, such as adding or subtracting two or more numbers, comparing numbers, or jumping to a different part of the instructions. For example, the CPU 502 may be any one of, but not limited to single, dual, triple, or quad core processors (on one single chip), graphics processing units, visual processing units, and virtual processors.

Memory (e.g., 504) may be, in general, any computer-readable medium (also referred to as a processor-readable medium) that may include any non-transitory (e.g., tangible) medium that participates in providing data (e.g., instructions) that may be read by a computer (e.g., by CPUs 502 of exemplary mobile device 500). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including radio waves, metal wire, fiber optics, and the like, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, the elements of the devices 102, 402, 500 may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the operations described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A computing device including a processor and a memory, and comprising:
   a display and an input mechanism;
   a voicemail application presented on the display and controllable by a user, the voicemail application comprising:
   a first stage at a first position along an axis, wherein a stage at the first position has a first position surface area;
   a playback control configured to cause playback of a voicemail associated with the stage at the first position;
   a second stage at a second position along the axis, wherein a stage at the second position has a second position surface area less than the first position surface area; and
   a third stage at a third position along the axis, wherein a stage at the third position has a third position surface area less than the second position surface area; and
   wherein the voicemail application is configured to:
   increase surface area of each of the second and third stages as the second stage is brought to the first position by the user while the third stage is brought to the second position, the first stage leaves the first position as the second stage is brought to the first position.

2. The computing device of claim 1, wherein the first, second, and third stages respectively include a visible first, second, and third contact identifier, and wherein the visible first, second, and third contact identifiers are respectively associated a first contact, a second contact, and a third contact of the user.

3. The computing device of claim 2, wherein the second position is between the first and third positions, and wherein at least one of the first, second, and third stage has a quadrilateral shape.

4. The computing device of claim 1, wherein the voicemail application is further configured to present a textual voicemail transcript of the voicemail associated with the stage at the first position, wherein the stage at the first position is one of the first, second, and third stage.

5. The computing device of claim 1, wherein the axis is a bisecting axis that substantially bisects stages respectively at the first, second, and third positions.

6. The computing device of claim 1, wherein surface area of the stage at the first position decreases as the stage at the first position leaves the first position.

7. The computing device of claim 6, the display and at least one input mechanism comprising a touchscreen configured to receive a touch input on a stage at one of the first, second, and third positions, wherein the voicemail application is configured to present in response to the touch input a function menu associated with the stage, the function menu including at least a call function and a delete function.

8. A system comprising:
   a mobile device having a touchscreen controllable by a user and a quantity of memory;
   a voicemail application stored on the quantity of memory and controllable via at least the touchscreen, the voicemail application configured to present:
   a first stage at a first position on the touchscreen, the first stage associated with a first voicemail, wherein a stage at the first position has a first height orthogonal to a first width;
   a second stage at a second position adjacent to the first position, the second stage associated with a second voicemail, wherein a stage at the second position has a second width orthogonal to a second height, the second width less than the first width and the second height less than the first height; and
   a third stage at a third position adjacent to the second position, the third stage associated with a third voicemail, wherein a stage at the third position has a third width less than the second width; and
   wherein the voicemail application is configured to:
   expand a second stage width and height as the second stage is brought to the first position; and
   decrease a first stage width and height as the second stage is brought to the first position.

9. The system of claim 8, wherein the first, second, and third stages are presented along a bisecting line that substantially bisects the first, second, and third stages, and wherein the voicemail application is further configured to increase a third stage width as the third stage is brought to the second position while the second stage is brought to the first position.

10. The system of claim 8, wherein the first width is substantially centered with respect to the second width, and the second width is substantially centered with respect to the first width.

11. The system of claim 8, wherein the stage at the first position includes a date and time log, and wherein the date and time log provides a date and a time the first voicemail was received by the mobile device.

12. The system of claim 8 wherein the voicemail application is configured to present a date and time log on the stage at the first position.

13. The system of claim 8, wherein the second stage includes a textual transcript of the second voicemail when the second stage is at the first position.

14. The system of claim 8, the voicemail application further configured to receive a touch input to display a plurality of voicemail application functions including at least a delete function, a reply function, and a call function, each available for user selection.

15. A method comprising:
    providing, via a graphical user interface (GUI) of a touchscreen of a computing device, a first stage, a second stage, and a third stage along a bisecting axis to a user such that the first stage, the second stage, and the third stage are substantially bisected by the bisecting axis, the first stage, the second stage, and the third stage respectively having a first surface area, a second surface area, and a third surface area, wherein the first stage, the second stage, and the third stage are positioned respectively at a first position, a second position, and a third position on the touchscreen;
    increasing, via the GUI, the second surface area of the second stage to the first surface area as the second stage is brought to the first position;
    increasing, via the GUI, the third surface area of the third stage to the second surface area as the third stage is brought to the second position;
    decreasing, via the GUI, the first surface area of the first stage while increasing surface area of the second and third stages; and
    providing a voicemail interface to the user, via the GUI, such that the user can play a voicemail associated with a stage at the first position.

16. The method of claim 15, wherein decreasing the first surface area of the first stage comprises decreasing the first surface area of the first stage as the first stage leaves the first position.

17. The method of claim 15 further comprising:
    providing a photo respectively on each stage, wherein each stage is respectively associated with a different voicemail.

18. The method of claim 15, wherein the stage at the first position includes a voicemail transcript of the voicemail associated with the stage at the first position.

19. The method of claim 15 further comprising:
    providing a fourth stage via the touchscreen at a fourth position adjacent to the third stage, the fourth stage having a fourth surface area along the bisecting axis such that the bisecting axis substantially bisects the fourth stage, wherein the fourth surface area is less than the third surface area; and
    increasing the fourth surface area of the fourth stage to the third surface area as the fourth stage is brought to the third position while the third stage is brought to the second position, wherein each of the stages have respective contact identifiers associated with respective user contacts.

20. The method of claim 19, wherein the first, second, third, and fourth stages are associated with a respective, first, second, third, and fourth voicemail.

* * * * *